H. C. BEHR.
PROCESS OF OPERATING PERCUSSIVE APPARATUS.
APPLICATION FILED NOV. 22, 1911.

1,055,857.

Patented Mar. 11, 1913.

5 SHEETS—SHEET 1.

Witnesses:
T. L. Mochene
Byron B. Collings.

INVENTOR
H. C. Behr
Wilkinson Fisher
& Witherspoon
Attorneys

H. C. BEHR.
PROCESS OF OPERATING PERCUSSIVE APPARATUS.
APPLICATION FILED NOV. 22, 1911.

1,055,857.

Patented Mar. 11, 1913.

5 SHEETS—SHEET 2.

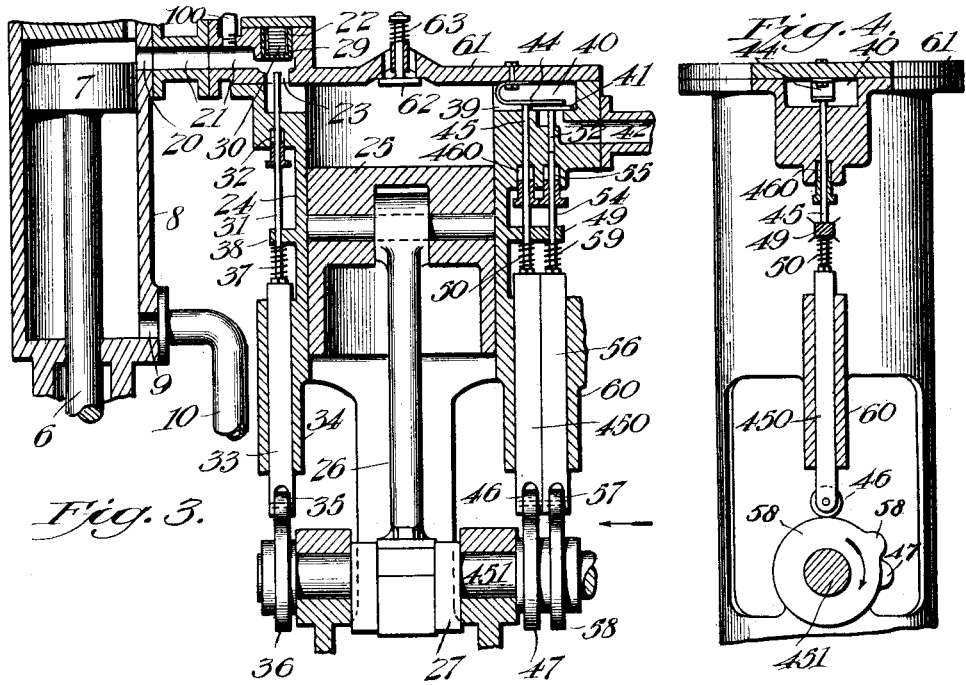
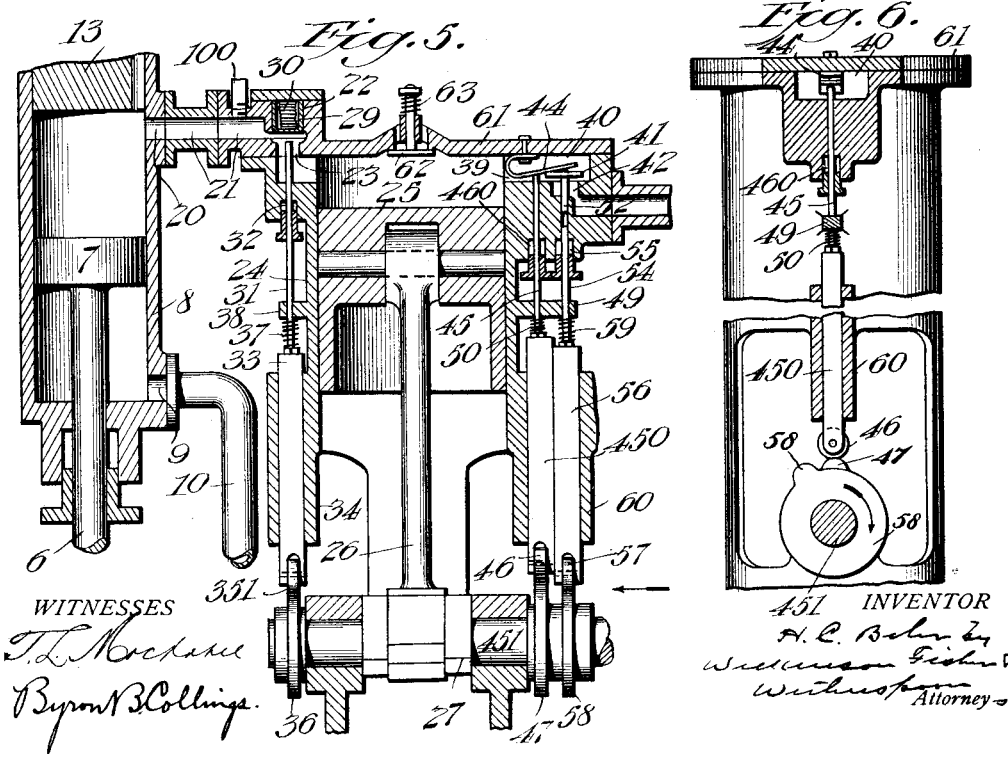

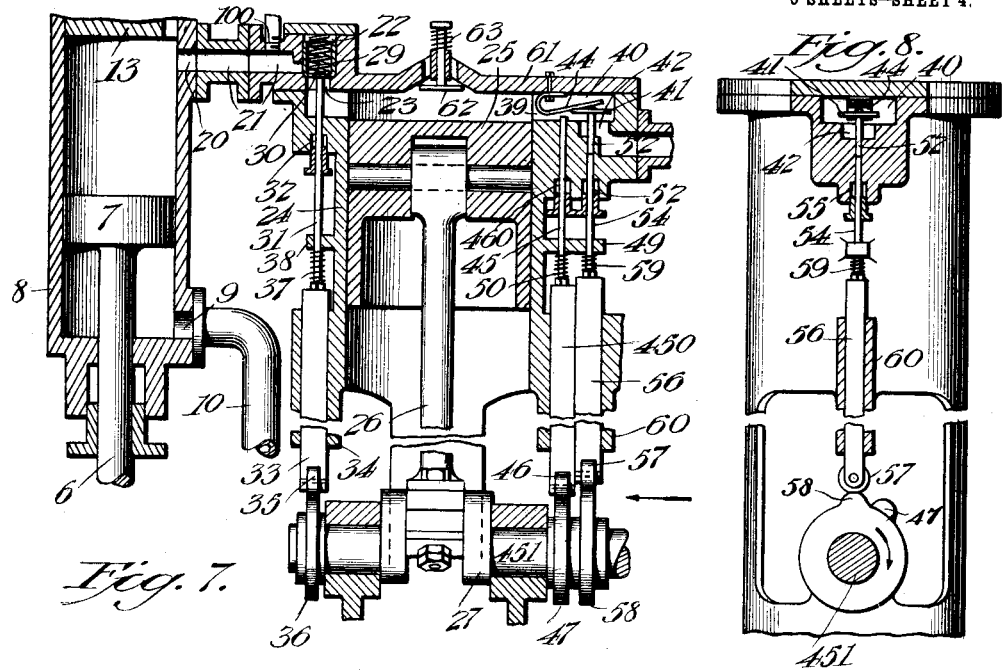
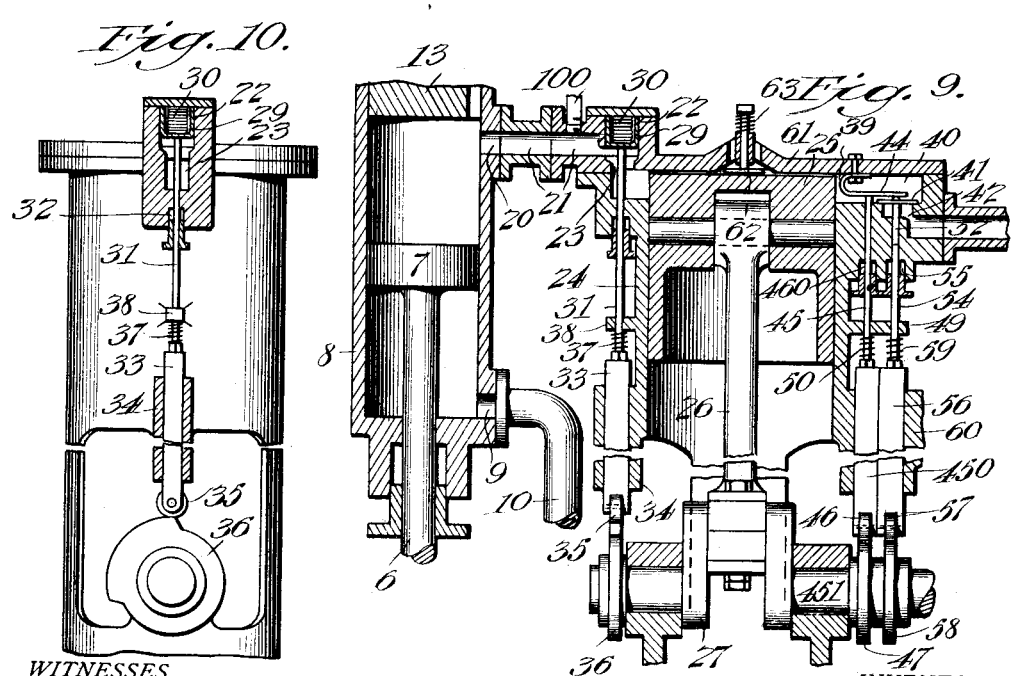

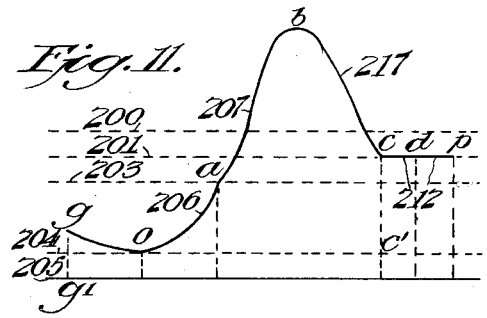
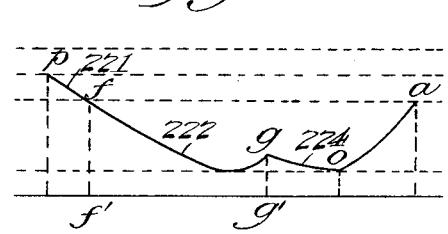
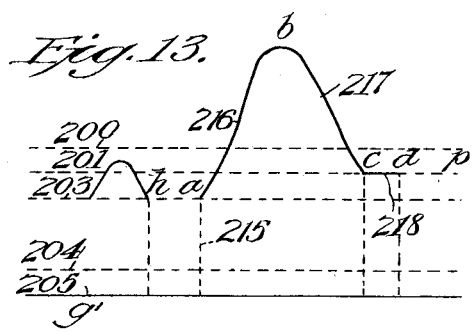
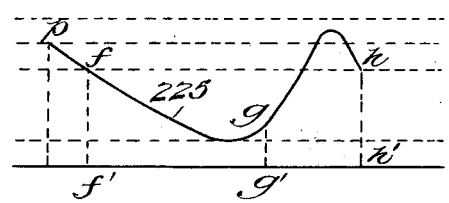
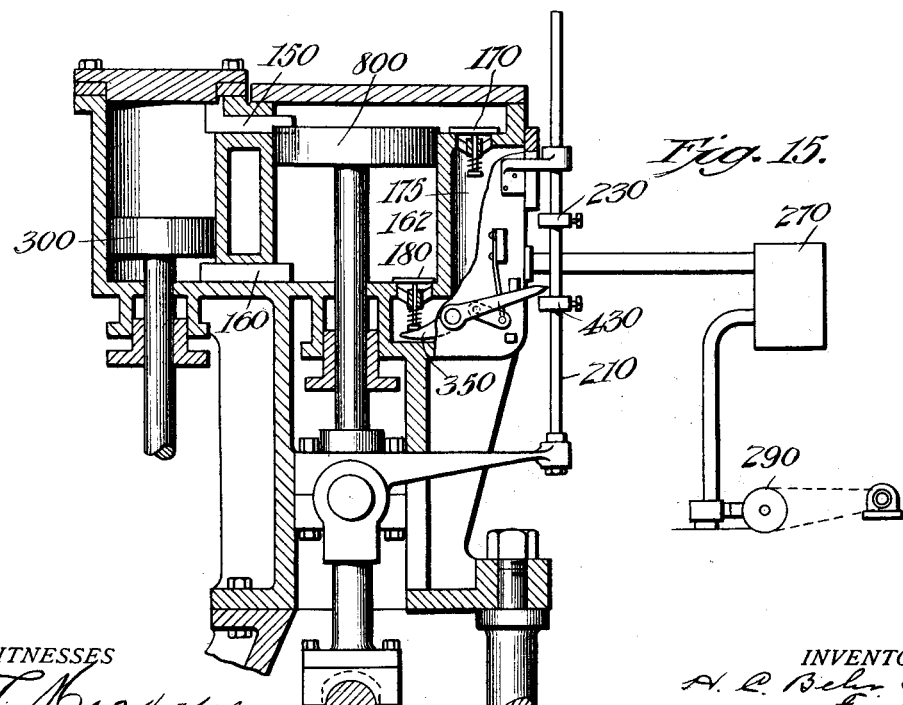

UNITED STATES PATENT OFFICE.

HANS CHARLES BEHR, OF JOHANNESBURG, TRANSVAAL.

PROCESS OF OPERATING PERCUSSIVE APPARATUS.

1,055,857.  Specification of Letters Patent.  Patented Mar. 11, 1913.

Application filed November 22, 1911. Serial No. 661,859.

*To all whom it may concern:*

Be it known that I, HANS CHARLES BEHR, a citizen of the United States, residing at Johannesburg, in the colony of Transvaal and country of South Africa, have invented certain new and useful Improvements in Processes of Operating Percussive Apparatus; and I do hereby declare the following to be a full, clear, and exact description of the invention, such as will enable others skilled in the art to which it appertains to make and use the same.

This invention relates to a process of operating pneumatic percussive apparatus in general, and especially to drills, hammers, and ore stamps, and has for its object to produce a method which will not waste energy, will cause said apparatus to deliver powerful and sudden blows with a minimum dwell of the striking member when in its lowest position, and one which will enable the parts to be made smaller, lighter, and at a less cost than those of the same character heretofore proposed.

With these and other objects in view, the invention consists in the novel steps constituting my process more fully hereinafter disclosed and particularly pointed out in the claims.

Figure 1:
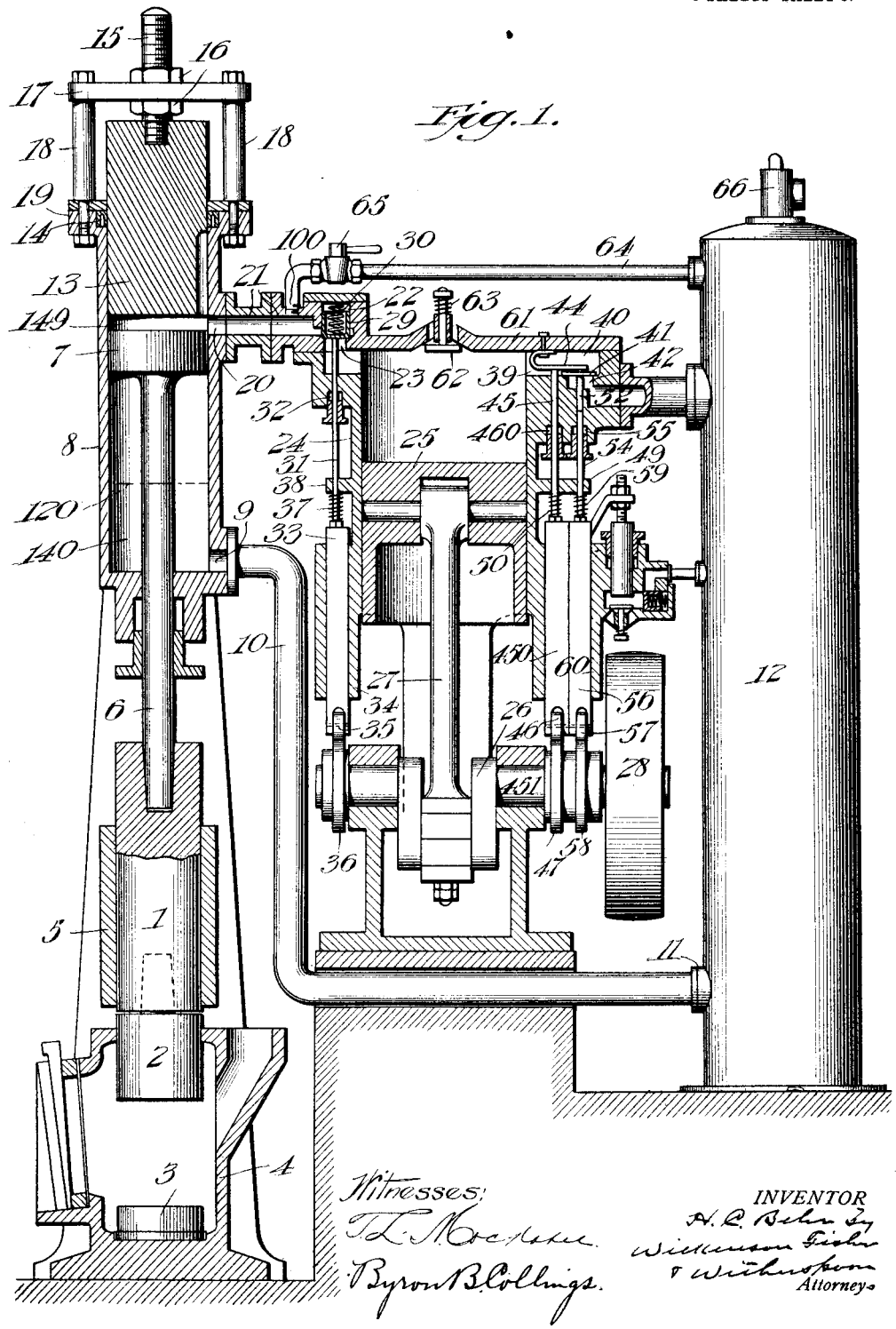
Figure 2:
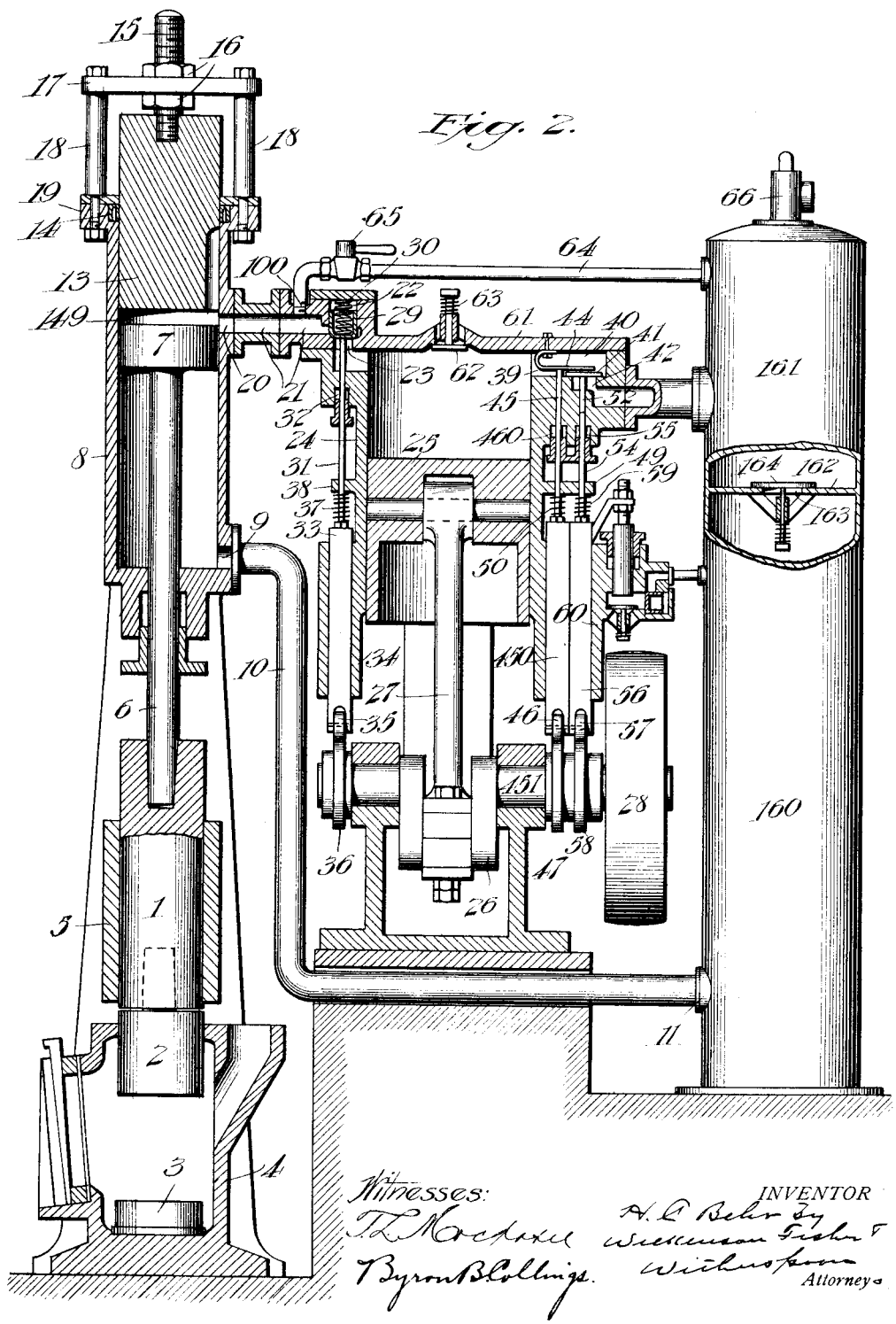

Referring to the accompanying drawings forming a part of this specification in which like numerals designate like parts in all the views:—Figure 1 is a sectional view illustrating an ore stamp capable of being operated by my process, and showing the operating piston in its lowest position about to begin its upward stroke and the stamp piston in its highest position just before it begins its downward stroke; Fig. 2 is a view similar to Fig. 1, but showing a modified form of apparatus employing two reservoirs, and illustrating the operating parts in the same position as in Fig. 1; Fig. 3 is a view of certain of the parts shown in Fig. 2, but showing their relative positions at the instant of beginning the down stroke of the piston 7; Fig. 4 is a detail side elevation of certain of the parts looking in the direction of the arrow in Fig. 3, and showing the angular position of the cam 47 at about the period of the completion of the downward stroke of the piston 25; Fig. 5 is a view similar to Fig. 3, but showing the relative position of the parts just before the completion of the upward stroke of the piston 25, and after the valve 41 has opened to admit pressure from the reservoir above the pistons; Fig. 6 is a side elevational view looking in the direction of the arrow in Fig. 5, and showing the angular positions of the cams 47 and 58 just before the piston 25 reaches the position shown in Fig. 5 and just before the valve 41 opens; Fig. 7 is a view similar to Fig. 5, but showing the positions of the parts when the stamp piston has completed its stroke and the valve 41 is being held open by the rod 54; Fig. 8 is a side elevational view looking in the direction of the arrow in Fig. 7, showing certain of the parts and the angular relations of the cams 47 and 58 when the piston 25 has reached the position illustrated in said Fig. 7; Fig. 9 is a view similar to Fig. 7, but showing the relation of the parts when the operating or actuating piston 25 has reached the limit of its upward stroke, and valve 29 is being held open by the rod 31; Fig. 10 is a view similar to Fig. 8, but illustrating the position of the cam 36 when the parts are in the position shown in Fig. 9; Figs. 11 to 14 inclusive, are diagrams showing pressure time curves illustrating the principles of my invention when performing the operations of a half cycle shown in the above figures, as well as its principles during the return stroke or operations of the other half of a complete cycle; and, Fig. 15 is a sectional view of a still further modified form of ore stamp to which my process is applicable.

It is well known when a vertically traveling piston, such as that of an ore stamp, or hammer, is subjected to the action of compressed air immediately preceding the blow, that the piston is continuously impelled downward not only by the expansion of the air, but also under the action of gravity, so that its velocity becomes greatly accelerated. It is also well known that the power of the blow varies with this velocity and that therefore it becomes of the greatest importance to prevent any cushioning or retardation of the downward stroke. Further, it often happens that the above acceleration causes the stamp piston to travel so fast that the propelling air above the same becomes actually rarefied, and its pressure falls below that of the atmosphere, in which case, of course, the blow is greatly retarded unless some preventing means is adopted. The same evil results occur to a less degree even in pistons traveling horizontally owing to their variable crank impelled movements and also to their continued velocity due to their great momentum. On the other hand, this rarefaction of the propelling air would render it practical to employ atmospheric pressure to return the pistons were it not for the fact that such pressure is so limited that it requires the parts to be made unnecessarily large and costly, and for the further fact that it would cushion the down stroke, as above pointed out. It is also well known that various devices have been heretofore proposed, which involve the employment at one period or another of compressed air to return the pistons as well as to accelerate them downward. But, in all such cases, so far as I am aware, either the blow is cushioned, or the energy is wasted, and it results that the crushing capacity in stamp pistons for example, is either reduced or it is maintained at a high cost. By my method, on the other hand, all of these objections are overcome, and in order to render its principles clear, I have illustrated it by a plurality of different constructions, selecting for convenience, the case of ore stamps, but it will be understood that the invention, as above stated, is broadly applicable to percussive apparatus in general.

Referring to Fig. 1 of the drawings:—1 represents the stamp head carrying a shoe 2, and 3 the die adapted to coöperate with said shoe. 4 represents the usual mortar box, and 5 a guide sleeve or other means for guiding the head 1. The piston rod 6 is secured by any suitable means to the stamp head 1 and carries at its other end the piston 7 free to move within the stationary cylinder 8. At the front, forward or lower end of the cylinder 8 there is provided a port 9 from which a pipe 10, preferably of flexible material, connects, as at 11, with a compressed air reservoir 12. The reservoir 12 is preferably of such a size or character, that its volume is many times that of the cylinder 8, and therefore the reciprocation of the piston 7 does not materially compress or expand the air in said reservoir, although the pressure maintained in the same is preferably above that of the atmosphere. The cylinder 8 is provided at its upper end, as seen in Fig. 1, with a plunger such as 13 passing through a suitable packing such as 14, and capable of being adjusted into and out of the cylinder by means of the screw 15 passing through the lock nuts 16, and the yoke 17 carried by the pillars or supports 18 secured to lugs 19 rigid with the said cylinder 8. The cylinder 8 is provided at or near the upward limit of the stroke of the piston 7 with a port 20, to which is connected pipe sections such as 21, preferably of a yielding material, in order to form a cushion as will appear below. In one of the pipe sections 21 there is provided a valve chamber 22 as shown, in which is located a valve 29 controlled by a spring 30, and which valve controls the port 23 leading into the operating cylinder 24 provided with the operating piston 25, connected with the rod 27 driven by the crank 26 which in turn is driven by the power pulley 28, as will be clear from the drawings. A lifting rod 31 passes through a stuffing box 32 provided on one side of the cylinder 24, and is connected with a slide block 33 guided in the slide way 34 and carries on its lower end a roller 35 which is driven by a cam 36 rigid with the crank shaft. The upper end of the said rod 31 is located below the valve 29, and is adapted to open said valve at regular intervals, and to permit the same to close, as will be readily understood. A spring 37 is provided between the lug 38 on the cylinder 24 and the upper end of the slide block 33 in order to maintain the roller 35 in constant contact with the cam 36. Opposite the port 23 in the cylinder 24 is another port 39 opening into a valve chamber 40, with which communicates a port 42 controlled by a valve 41 which in turn is normally held to its seat by a spring 44, as shown. A rod 45 passing through a stuffing box 460 is adapted to lift the spring 44 at predetermined intervals by the means now to be described. 450 represents a slide bar connected at its upper end with said rod 45 and carrying at its lower end a roller 46, resting on the cam 47, rigid with the crank shaft 451. A spring 50 surrounds the rod 45 between the lug 49 on said cylinder 24 and the upper end of said slide bar 450. The stem 52 of the valve 41 is guided in the casting, as illustrated, and adapted to contact therewith is the rod 54 passing through said lug 49 and surrounded by the spring 59 resting between said lug 49 and the upper end of the slide bar 56 carrying the roller 57 resting upon the cam 58 also rigid with the crank shaft 451. 55 represents a stuffing box through which said rod 54 passes. In the head 61 of the cylinder 24 is an inlet valve 62 controlled by the spring 63 for the purpose of admitting air into said cylinder, as will appear hereinafter. Leading from the reservoir 12 is a pipe 64 provided with a cock 65 and connected as at 100 with the pipe section 21, as shown. 66 represents any suitable relief valve for the reservoir 12.

In the modified construction shown in Fig. 2 instead of a single reservoir 12, I have illustrated two reservoirs 160 and 161, preferably having a common casing and separated by a partition 162, provided with an opening 163 controlled by a spring pressed valve 164. Otherwise, the construction is the same as in Fig. 1, but the operation is different and it possesses many additional advantages, as will appear below.

The operation of my invention so far disclosed, referring to Figs. 1 to 10, is as follows:—As is well known, in ore stamps, the shoe 2 and anvil 3 usually wear away, and therefore if the stroke of the piston 7 is maintained constant, the ore is not crushed with the same efficiency or facility as would be the case if no wearing occurred. On the other hand, it is very desirable, and practically imperative, that the stroke of the piston 7 and especially the clearance space 149 above said piston 7, should be kept constant, in order that the strength of blow, as well as the efficiency of the crushing operation may be maintained. Therefore, in order to remedy the evil effects of the wearing of the parts, I provide the plunger 13, which, as the said parts wear, may be adjusted into the cylinder 8 and thereby maintain the space 149 above said piston 7 at any predetermined volume. As the parts wear, however, the lower limits 120 of the travel of the piston 7 will constantly approach the lower end of the cylinder 8, and therefore it is necessary to provide a sufficient length of cylinder below the normal travel of the piston 7 to allow for the extreme wear of the shoe and die. This is indicated in Fig. 1 by the length 140 of the piston below the dotted line 120. Further, it will be observed that as the piston descends, the compressed air above the same first exerts a high pressure upon the piston, after which the piston 25 slows down as it nears the end of its stroke. Further the piston 7 travels so fast, owing to the combined action of gravity and the expansion of this air, that the said air becomes rarefied, and it results that the said piston 7 is subjected to varying pressures on its top surface. In fact, so great is the ecceleration of the ordinary stamp piston during its downward stroke so slow is the motion of the piston 25 during the latter portion of its stroke, that the pressure on the top surface of piston 7 frequently falls below that of the atmosphere, and it would be practical to employ atmospheric air to return the piston except for the objections above noted. By maintaining a supply of compressed air below the piston 7, however, I am enabled not only to lessen the cost of the parts, and to make them smaller, but I am also enabled to lessen the danger of breakage of the stamp piston, which frequently occurs owing to its great inertia when very heavy blows are imparted. Therefore, this said supply of compressed air constitutes an important feature of my invention. But, to start the operation of my stamp, the system should first be charged with compressed air, and in accomplishing this I prefer to raise the piston 7 into the position shown in Fig. 1, and to place a block, not shown, between the shoe 2 and the die 3 in order to support said piston in its elevated position. The piston 25 is then brought to its extreme upper position near the cylinder head 61, and is then caused to descend to the position shown in Fig. 1. As the said piston 25 descends, air is drawn in past the valve 62, and upon forcing said piston 25 upwardly again, the air thus taken in is forced past the valve 29 through the cock 65 which has been opened by hand, and into the reservoir 12. The piston 25 is repeatedly reciprocated until the said reservoir 12 is charged to a predetermined pressure, which will be indicated by the blow-off of the safety valve 66. The system being thus charged with compressed air, the block, not shown, may be removed from the shoe 2, and the said shoe allowed to rest upon the die 3. Later, while the apparatus is being operated, the cock 65 may be closed and a supply of compressed air maintained in the reservoir 12 through power derived from the reciprocating member 56 and its associated parts, all as will be clear from my Patent #1,038,521, Sept. 17, 1912. When in operation, if we assume the piston 7 has traveled to the lower end of its stroke Fig. 7 the parts are so timed that it will dwell there a brief period before the piston 25 completes its upward stroke, as will appear below. For this position of the parts, the timing is also such that the valve 41 is still open, it having been previously forced open by the rod 54 through the cam 58, Fig. 8 as will also appear further on. As soon, however, as the piston 25 moves downward the valve 41 closes. The parts are also so timed that when the piston 25 has reached the limit of its upward stroke Fig. 9, the valve 29 has begun to open owing to the upward movement of the rod 31 through the cam 36, Fig. 10. This latter valve remains held open Figs. 9 and 10 until the piston 7 is near the end of its upward stroke, but closes just before said stroke is completed, and it therefore permits air to be trapped above said piston 7 and compressed, thereby forming a cushion for the upward stroke of said piston. The final pressure of this trapped air, however, is not greater than the pressure of the compressed air which is maintained below said piston 7, as will likewise presently appear.

In order to render more clear the method of operating my ore stamp, we may suppose the parts to be in the position shown in Fig. 3, and the piston 25 to have made a portion of its upward stroke, and therefore to have compressed the air in the cylinder 24 sufficiently to lift the valve 29. When this valve 29 has been thus lifted, the pressure of the air above the pistons 25 and 7 will exceed that portion of the pressure in the reservoir below the piston 7 which is effective in raising said piston, and the said stamp piston 7 will accordingly begin its downward stroke. It is very desirable, of course, to deliver the heaviest blow possible, and in order to do this the piston 7 should gain in velocity during its entire downward stroke. Accordingly the parts are so timed that during the beginning of the downward stroke of the piston 7, the piston 25 has reached its maximum velocity, or is at about its mid stroke. After passing its mid stroke, owing to its crank motion, the said piston 25 of necessity loses velocity up to the end of its upper stroke, and as stated above, but in the meantime, the air which was compressed while the said piston 25 was at its maximum velocity continues to expand above the piston 7, and it thereby accelerates the velocity of the latter. But, since the velocity of the piston 7 continues to increase, and the velocity of the piston 25 continues to decrease, there will come a period during the strokes of both pistons at which the total volume of air inclosed behind them will increase. From this period on, therefore, instead of a compression taking place there will be an expansion of the air behind both pistons, and it is clear, unless something prevented, it would happen that such expansion would cause the pressure above the piston 7 to fall to such a degree that the compressed air below said piston would have a retarding effect, and would cause the said piston to have a lower final velocity and to deliver a correspondingly weaker blow. In order to prevent a reduction of pressure leading to such a result, air is automatically admitted above the pistons 25 and 7 through the valve 41 from the reservoir 12, when ever the pressure above said pistons drops to a given point, all as will now appear.

In both forms of stamps shown in Figs. 1 and 2, in order to accomplish the admission of reservoir air above the pistons automatically and thereby prevent the constant pressure below the piston 7 from cushioning its downward stroke, the parts are so timed that during the continued upward movement of the piston 25 the pressure of the spring 44 is taken off the valve 41 by the rod 45, as illustrated in Figs. 5 and 6, before the pressure above the pistons falls to that in the reservoirs. It results from this that the said valve 41 will open whenever the reservoir pressure slightly exceeds the pressure in the cylinder 24. The opening of the valve 41, supposing a single receiver 12 is employed, causes the pressure from the said reservoir to be equalized above and below the piston 7, and the said piston 7 therefore completes its stroke without any retarding pressure beneath it. But, as above stated, the said piston 7 strikes its blow and comes to rest before the piston 25 has completed it upward stroke, so that there is more air above the pistons than there was when the cycle of one full revolution began with the piston 25 at the extreme end of its upward stroke. Consequently, the air taken in during the continued upward stroke of the piston 25 must be expelled past the valve 41 and forced back into the reservoir 12 during the completion of said upward stroke, as illustrated in Figs. 5 and 7. In order to accomplish this with the least loss of power, the valve 41 must be prevented from closing automatically upon the beginning of the expulsion of air back into the reservoir 12. Consequently, the rod 54 has been provided and the parts are further so timed, as illustrated in Figs. 7 and 8, that the cam 58 prevents the said valve 41 from closing until the piston 25 has reached the end of its upward stroke; then the said cam 58 has moved sufficiently to permit the rod 54 to fall, and the valve 41 to close. There is then the same pressure above the pistons as in the recsevoir, and also the same pressure as there was for the same position of the two pistons as when the cycle of operation started. All succeeding cycles will operate in the same manner.

If we now consider the descent of the piston 25, remembering that the piston 7 is at its lowest position, it will be clear that as the said piston 25 moves downward, the air in the cylinder 24, and above the piston 7, will at first continually diminish in pressure. It will, therefore, be clear that a point will soon be reached at which the pressure of the said air above the pistons 7 and 25 will be sufficiently small to permit the compressed air below the piston 7 to lift the same. It will now be clear that the piston 7 must dwell at the end of its downward stroke for a brief period while the piston 25 begins to move downwardly. As the piston 25 continues to descend, it will further be understood that the reservoir pressure forces the piston 7 to ascend and that the timing of the parts is such as to cause the valve 29 to be held open until just before the completion of the upward stroke of the piston 7 and the downward stroke of the piston 25, when said valve 29 closes. Therefore, the air above said piston 25 is further slightly expanded after the said valve 29 closes, while the air above said piston 7 is compressed. But, the air above the piston 25 is again compressed on the return or upward stroke of said piston 25, and as soon as this new pressure created by the beginning of the upward stroke of the piston 25, slightly exceeds the pressure of the trapped air above said piston 7, the valve 29, as above stated, will be forced open automatically, as illustrated in Fig. 5, and the piston 7 forced downwardly. Further, it will be seen that the air which was originally trapped above the piston 7, was compressed by the pressure of the air below the piston 7, and that consequently the pressure in the cylinder 24 during this upward movement of the piston 25 need not greatly exceed the constant reservoir pressure of the air below the piston 7.

When, however, a plurality of reservoirs such as 160 and 161 shown in Fig. 2 is employed, the operation differs somewhat from the foregoing, owing to the fact that the pressures from said reservoirs above and below the piston 7 may vary independently, and that therefore, the pressure above said piston 7 on its up stroke can be made less than the pressure below the same, while on the down stroke the pressure below the said piston 7 can be neutralized so as to prevent the blow from being cushioned. A number of advantages flow from this modification of my construction, as will presently appear.

In order that the exact principles underlying the operation of my ore stamp may be understood, I have graphically illustrated in Figs. 11 to 14 by pressure curves, the operation when a plurality of reservoirs or receivers are employed, and these curves will also render clear the operation when a single reservoir or receiver 12 is employed. Referring to the diagram shown in Fig. 11, in which the ordinates represent pressure and the abscissæ represent time:—The dotted line 200 represents the pressure of the compressed air below the piston 7. The line 201 represents the pressure during the down stroke of piston 7 in the receiver 161. The line 203 represents the effective pressure tending to raise the piston 7, which is equal to the pressure in the reservoir 160 less the weight of the piston and its co-acting parts. The line 204 represents the pressure in the cylinder 24 when the upward stroke of the piston 25 begins, the valve 29 being closed. The line 205 represents the line of no pressure. $o$ represents the period at which the piston 25 begins its upward movement. 206 is a curve representing the increasing pressure of the air in the cylinder 24 until it reaches a pressure equal to the effective pressure at which time the valve 29 lifts and communication is established with the space 149 above the piston 7. The curve 207 represents the increasing pressure of the air above the two pistons up to the period $b$ after which the volume increase due to the accelerated downward movement of the piston 7, exceeds the volume decrease due to the upward movement of piston 25 down to the period $c$, as indicated by the curve 217. The line 212 represents the constant pressure which is maintained above said pistons by the opening of the valve 41 during the remainder of the downward stroke of piston 7 and the upward stroke of piston 25. The point $d$ on the line 212, designates the end of the stroke of the piston 7. Further, the portion $c$—$d$ of the line 212 represents the period during which air has been taken in from the reservoir 161 to maintain the pressure $c$—$c'$ constant; and the line $d$—$p$ represents the period during which the re-expulsion of the same amount of air at the same pressure takes place, during the period after the completion of the downward stroke of piston 7, to the completion of the upward stroke of piston 25.

Referring to Fig. 13—$a$ represents the same period as in Fig. 11. The line 215 represents the increasing pressure under which the piston 7 begins to move downward at the period $a$. The curve 216 represents the increasing pressure above the piston 7 until the period $b$ in Fig. 11 is reached; and the curve 217 represents the decreasing pressure above the piston until the period $c$ in Fig. 11 is reached. Said curve 217 down to the point $c$ also represents the period of time during which the pressure decreases, due to the increase of volume displacement of piston 7 being at a more rapid rate than the volume decrease due to the volume displacement of piston 25. The line 218 represents the constant pressure above said piston down to the completion of its downward stroke.

Referring now to Fig. 12, which is a diagram of the pressures during the down stroke of the piston 25, the point $p$ represents the pressure above the piston 25 which existed at the end of its upward stroke. The curve 221 represents the expansion of the air as the piston 25 descends, until the period $f$ is reached corresponding to the pressure $f$—$f'$, which is the effective lifting pressure underneath the piston 7. The curve 222 represents the expansion of the air above both pistons as the piston 25 continues to descend until the period $g$ is reached, at which period the valve 29 closes, and the pressure above the piston 7 increases somewhat. As the piston 25, however, continues to descend, the pressure above the same continues to diminish, as is indicated by the curve 224, until the point $o$ is reached again and the cycle is completed.

Referring now to Fig. 14, which shows a curve of pressures above the piston 7 on its upward stroke, the point $f$ corresponds to the same point in Fig. 12, and the curve 225 represents the expansion of the air above both pistons owing to the continued descent of the piston 25, until the point $g$ is reached, which is the same period as that illustrated in Fig. 12. At the period $g$, valve 29 closes, so that the air is trapped and compressed by the kinetic energy of piston 7. The pressure of this trapped air first rises above and then drops down to the effective pressure $h$—$h'$ beneath the said piston, and the cycle is completed. It will thus be seen that in both forms of my invention, I am enabled to adjust the length of the cylinder 8 as the shoe 2 and die 3 wear, and thereby maintain the stroke of the piston 7 substantially constant, as well as the clearance space 149 above the same. I, therefore, am enabled to attain a maximum efficiency in cushioning in the operation of the stamp. Further, by adding additional length 140 to the cylinder 8, I am enabled to return the said piston 7 by the action of compressed air, while at the same time, I avoid all cushioning of the said piston during its downward stroke. It results from this that the parts may be made much lighter and smaller, and therefore the cost is greatly reduced over what would be the case if I depended upon atmospheric pressure to return the piston 7.

In addition to the above, when two or more reservoirs are employed, as is illustrated in Fig. 2, the reservoir pressure above the piston 7 on its return stroke may be lessened to any desired degree below the pressure beneath said piston, as above disclosed, and therefore, I am further enabled to cause the periods of the up and down strokes to vary. This variation in the periods of the up and down strokes enables me to secure any desired reduction in the period of dwell of the piston 7, at the bottom of the cylinder 8, and therefore, enables me to secure a maximum period for the introduction of ore underneath the stamp head. It results from this that the capacity of the stamp is greatly increased.

The form of stamp piston illustrated in my Fig. 15 is the same as that which has already been fully disclosed and claimed in my co-pending application entitled "Pneumatic percussive machines," filed on the 14th day of November 1911, Serial No. 660,250. Said construction need not be disclosed in detail here, but may be briefly described as follows:—300 represents the stamp piston; 800 the operating piston; 150 and 160 passages leading between the stamp cylinder 161 and the operating piston cylinder 162; 175 a reservoir of compressed air fed from the supply reservoir 270, the pressure of which is maintained by the compressor 290; and 170 and 180 represent valves respectively, controlling the admission of air from the reservoir 175 above and below the pistons. A lever 350 operates the valve 180, and is controlled by the tappets 230 and 430 on the reciprocating rod 210. The operation of this third form of stamp employed to illustrate the principles of my invention, briefly is as follows:—

As the piston 800 descends, it compresses the air beneath the piston 300 and causes the same to rise. Whenever, however, the pressure of the air above the piston 300 falls below that in the reservoir 175, the valve 170 lifts and restores the pressure above the piston 300 to that in the reservoir. This occurs irrespective of the position of the piston 300. It consequently follows that when the piston 800 is ascending to force the piston 300 downward, and the pressure above the piston 300 becomes sufficiently reduced owing to the acceleration of the latter, to enable the compressed air below the piston 300 to retard the same, the valve 170 will lift and cause the pressure above and below the said piston 300 to be equalized, and thereby any retardation of the stroke of the stamp head is prevented. It further follows that since the system is a closed one, all energy which may be expended in compressing the air of the system, is subsequently recovered upon the expansion of the said air. The same remarks apply to each of the other two forms of my invention which have been disclosed.

It will thus be seen that in connection with each of the apparatus illustrated to explain the principles of my invention, I have disclosed a method of operation which does not waste energy which enables the apparatus to deliver powerful and sudden blows with a minimum dwell of the striking member when in its lowest position, and also one which enables me to make the parts smaller, lighter, and at a less cost than those of the same character heretofore proposed.

It is obvious that those skilled in the art may vary the details of my method without departing from the spirit thereof, and therefore I do not wish to be limited to the above disclosure except as may be required by the claims.

What I claim is:—

1. In a percussive apparatus, the process of delivering an uncushioned blow, which consists in forcing forward against a constant pressure a piston by means of a fluid under a varying pressure adapted to fall to a predetermined point; and in preventing said varying pressure from falling below said point while actuating said piston, substantially as described.

2. In a percussive apparatus the process of delivering an uncushioned blow without substantial waste of energy, which consists in forcing forward a piston against a constant pressure by means of a fluid under a varying pressure adapted to fall to a predetermined point; preventing said varying pressure from falling below said point while actuating said piston; and recovering on the expansions of said fluid any energies of compression that may have been expended in compressing the same, substantially as described.

3. In a percussive apparatus the process of delivering an uncushioned blow, which consists in supplying a constant fluid pressure on one side of a moving piston; supplying a higher fluid pressure on the other side of said piston adapted to continuously fall to a predetermined point as said piston moves; and in supplying an additional fluid pressure on said other side of said piston to prevent said varying pressure from falling below said point, substantially as described.

4. In a percussive apparatus the process of delivering an uncushioned blow without substantial waste of energy, which consists in supplying a constant fluid pressure beneath a moving piston; supplying an initially higher fluid pressure above said piston while permitting it to continuously fall to a predetermined value; supplying an additional pressure above said piston to prevent said varying pressure from falling below said first value; and in recovering on expansion any energy which may have been expended in compressing said fluid, substantially as described.

5. In a percussive apparatus the process of delivering an uncushioned blow, which consists in supplying a constant fluid pressure on one side of a moving piston; supplying a higher fluid pressure on the other side of said piston adapted to continuously fall to a predetermined point as said piston moves; and in supplying an additional fluid pressure of a less value that said constant pressure on said other side of said piston to prevent said varying pressure from falling below said point, substantially as described.

6. In a percussive apparatus the process of delivering an uncushioned blow without substantial waste of energy, which consists in supplying a constant fluid pressure beneath a moving piston; supplying an initially higher fluid pressure above said piston while permitting it to continuously fall to a predetermined value; supplying an additional pressure of a less value than said constant pressure above said piston to prevent said varying pressure from falling below said first value; and in recovering on expansion any energy which may have been expended in compressing said fluid, substantially as described.

7. In a percussive gravity apparatus, the process of delivering an uncushioned blow, which consists in supplying a constant fluid pressure below a moving piston; supplying an initially higher fluid pressure above said piston and permitting the same to fall to a predetermined value before said piston reaches the end of its downward stroke; permitting said piston to fall under the influence of gravity and said varying pressure until the said predetermined value is about to be reached; and in then supplying an additional fluid pressure above said piston of a less value which when augmented by the weight of the moving parts, will equal said constant pressure, substantially as described.

8. In a percussive gravity apparatus, the process of delivering an uncushioned blow without substantial waste of energy, which consists in supplying a constant fluid pressure below a moving piston; supplying an initially higher fluid pressure above said piston and permitting the same to fall to a predetermined value before said piston reaches the end of its downward stroke; permitting said piston to fall under the influence of gravity and said varying pressure until the said predetermined value is about to be reached; then supplying an additional fluid pressure above said piston of a less value which when augmented by the weight of the moving parts, will equal said constant pressure; and in recovering on expansion any energy which was expended in compressing said fluid, substantially as described.

In testimony whereof, I affix my signature, in presence of two witnesses.

HANS CHARLES BEHR.

Witnesses:
T. A. WITHERSPOON,
N. CURTIS LAMMOND.

Copies of this patent may be obtained for five cents each, by addressing the "Commissioner of Patents, Washington, D. C."